United States Patent
Stahn et al.

(10) Patent No.: US 9,702,488 B2
(45) Date of Patent: Jul. 11, 2017

(54) SCREW CONNECTION DEVICE FOR FLUID LINES, IN PARTICULAR FOR MOTOR VEHICLE FLUID LINES

(71) Applicant: TI Automotive (Heidelberg) GmbH, Heidelberg (DE)

(72) Inventors: Andreas Stahn, Rauenberg (DE); Uwe Fiedler, Altluβheim (DE); Uenal Oezbenlikan, Rauenberg (DE)

(73) Assignee: TI Automotive (Heidelberg) GmbH, Heidelberg (DE)

( * ) Notice: Subject to any disclaimer, the term of this patent is extended or adjusted under 35 U.S.C. 154(b) by 0 days.

(21) Appl. No.: 14/077,914

(22) Filed: Nov. 12, 2013

(65) Prior Publication Data

US 2014/0132001 A1 May 15, 2014

(30) Foreign Application Priority Data

Nov. 12, 2012 (DE) .................... 20 2012 104 347 U

(51) Int. Cl.
| | |
|---|---|
| *F16L 15/08* | (2006.01) |
| *F16L 19/00* | (2006.01) |
| *F16L 19/02* | (2006.01) |
| *F16L 19/028* | (2006.01) |
| *B60T 17/04* | (2006.01) |
| *F02M 55/00* | (2006.01) |

(52) U.S. Cl.
CPC ............ *F16L 15/08* (2013.01); *B60T 17/043* (2013.01); *F02M 55/005* (2013.01); *F16L 19/005* (2013.01); *F16L 19/028* (2013.01); *F16L 19/0225* (2013.01); *F16L 19/0283* (2013.01)

(58) Field of Classification Search
CPC ....... F16L 19/046; F16L 15/08; F16L 19/005; F16L 19/028; F16L 19/0225; F16L 19/0283; B60T 17/043; F02M 55/005
USPC ..... 285/354, 389, 233, 390, 206, 353, 334.4
See application file for complete search history.

(56) References Cited

U.S. PATENT DOCUMENTS

| | | | | |
|---|---|---|---|---|
| 1,815,002 | A | * | 7/1931 | Beecher ...................... 285/148.9 |
| 2,251,715 | A | * | 8/1941 | Parker ................... F16L 19/046 |
| | | | | 285/114 |
| 2,313,323 | A | * | 3/1943 | Irving ........................... 285/341 |

(Continued)

FOREIGN PATENT DOCUMENTS

| | | |
|---|---|---|
| CH | 526066 A | 7/1972 |
| DE | 2910678 A1 | 9/1979 |

(Continued)

*Primary Examiner* — David E Sosnowski
*Assistant Examiner* — James A Linford
(74) *Attorney, Agent, or Firm* — Brinks Gilson & Lione

(57) ABSTRACT

A screw connection device for fluid lines having a coupling nut with an interior space and having an internal threading running over the circumference of the interior space, as well as having a connecting element with an external threading. A line end of a fluid line is accommodated in the coupling nut, wherein the line end exhibits an end shape. When the internal threading of the coupling nut is screwed to the external threading of the connecting element, a locating surface disposed in the interior space of the coupling nut is moved toward the back end of the end shape, or vice versa, respectively. A spring element is disposed between the locating surface and the back end of the end shape, running over the circumference of the fluid line.

15 Claims, 6 Drawing Sheets

(56) References Cited

U.S. PATENT DOCUMENTS

| | | | | |
|---|---|---|---|---|
| 2,354,538 | A | * | 7/1944 | Parker .......................... 285/234 |
| 2,428,143 | A | * | 9/1947 | Chavayda .................... 285/233 |
| 5,332,267 | A | | 7/1994 | Harrison |
| 5,811,055 | A | * | 9/1998 | Geiger ............................. 266/49 |
| 6,572,155 | B2 | * | 6/2003 | Dehmer ..................... 285/334.5 |
| 2002/0005642 | A1 | * | 1/2002 | Kusanagi ...................... 285/354 |
| 2002/0190523 | A1 | * | 12/2002 | Berghaus ...................... 285/389 |
| 2009/0189391 | A1 | | 7/2009 | Ferlin et al. |

FOREIGN PATENT DOCUMENTS

| | | |
|---|---|---|
| DE | 102004018217 A1 | 12/2005 |
| DE | 102010004918 A1 | 8/2010 |
| EP | 1241348 A2 | 9/2002 |
| EP | 1260750 A1 | 11/2002 |
| EP | 1624183 A1 | 2/2006 |

* cited by examiner

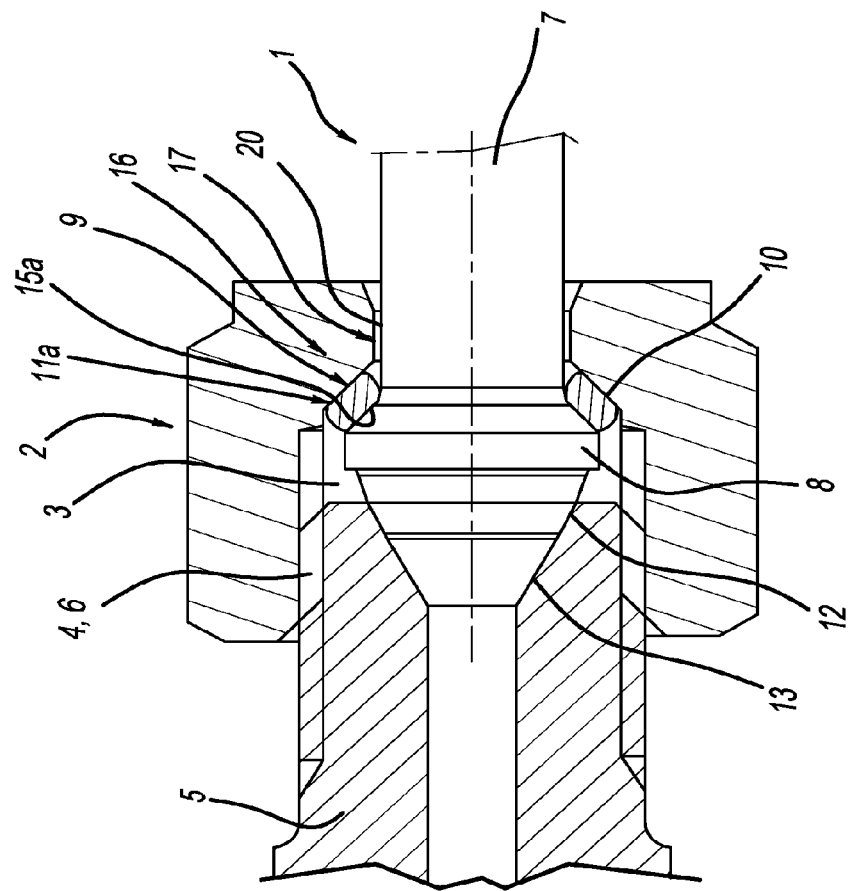

SCREW CONNECTION DEVICE FOR FLUID LINES, IN PARTICULAR FOR MOTOR VEHICLE FLUID LINES

CROSS REFERENCE TO RELATED APPLICATION

This patent application claims priority pursuant to Title 35 USC Section 119(e) to German Application No. 20 2012 104 347.5 filed Nov. 12, 2012, entitled "Screw Connection Device for Fluid Lines, In Particular for Motor Vehicle Fluid Lines," the entire specification and drawings of which are hereby incorporated by reference herein as if fully set forth.

BACKGROUND

The invention concerns a screw connection device for fluid lines, in particular for motor vehicle fluid lines. In the framework of the invention, at least one tubing or motor vehicle fluid line is connected to a wider fluid line or access line or a connection unit. A motor vehicle fluid line means, in the framework of the invention, a fuel line or a brake fluid line.

Screw connections of the type specified above are known in the field in different embodiments. Many of these known screw connection devices are distinguished by a disadvantageously low release rotation angle, or loosening rotation angle. In screwing said screw connection devices, in particular, a turning of the fluid line may occur together therewith, and through a torsion in the fluid line, a spring force is then stored, as it were, in the fluid line. The torsion in the fluid line generates a return torque, which may lead to an undesired or uncontrolled loosening or releasing of the screw connection device. An undesired loosening or releasing of the screw connection device can, in particular, also be caused by vibrations, such as those that frequently occur in motor vehicles. A loosening or releasing in this manner of the screw connection device can result in very disadvantageous leakage.

In response to this, the present invention addresses the problem of providing a screw connection device of the type specified above, with which an undesired loosening or releasing of the screw connection can be prevented in an effective and functionally reliable manner.

SUMMARY OF DISCLOSURE

In order to solve this technical problem, the invention teaches of a screw connection device for fluid lines, in particular for motor vehicle component fluid lines, having a coupling nut with an interior space and with an internal threading running over the circumference of the interior space, and with a connecting element having an external threading, wherein a line end of a fluid line is accommodated in the coupling nut, or respectively, in the interior space of the coupling nut, and wherein the line end exhibits an end shape at the front end, wherein when the internal threading of the coupling nut is screwed into the external threading of the connecting element, a locating surface disposed at the back end of the interior space of the coupling nut is moved toward the back end of the end shape, or the back end of the end shape is moved toward the locating surface, respectively, and wherein, in particular in the screwed together state of the screw connection device, a circumferential spring element is disposed between the locating surface and the back end of the end shape over the circumference of the fluid line, or over the internal circumference of the interior space, respectively.

As already explained in the introduction, in the framework of the invention, a motor vehicle fluid line means, in particular, a fuel line or a brake fluid line. It is preferred that for practical purposes the end shape of the front end is designed in the shape of a flange. A flange, in the framework of the invention, typically means a flaring of the outer diameter of the fluid line, or the end of the fluid line, respectively. Within the framework of the invention, the end shape, or the flange, respectively, of the fluid line, or the motor vehicle fluid line, respectively, is accommodated in the interior space of the coupling nut when the screw connection device is in the screwed together state.

Furthermore, in the framework of the invention, the spring element rests against the locating surface of the coupling nut when the screw connection device is in the screwed together state, as well as resting against the back end of end shape the fluid line, or motor vehicle fluid line, respectively. For practical purposes, the internal threading of the coupling nut is formed at least in the front end region, or the end region facing the connecting element, respectively, of the coupling nut.

In the framework of the invention, the connecting element is a connection means for connecting a connecting line, or is connected to a connecting line, or accommodates a connecting line. According to a preferred embodiment of the invention, the connecting element is a screw fitting with a external threading that accommodates a connecting line. According to another preferred embodiment according to the invention, the external threading is provided directly on the fluid line that is to be connected, or on the connecting line. In this case, the coupling nut is thus screwed directly onto the fluid line that is to be connected, or onto the connecting line, respectively. In the framework of the invention, the external threading of the connecting element is disposed on the end of the connecting element facing the coupling nut.

For practical purposes, the end shape of the line end of the fluid line rests with a connecting surface against a complementary connecting surface of the connecting element when the screw connection device is in the screwed together state. It is recommended that the connecting surface of the end shape is disposed at an angle to the longitudinal axis L of the fluid line. For this, the connecting surface can be designed to be conical or rounded. The complementary connecting surface of the connecting element is then likewise designed to be conical or rounded, in a corresponding manner.

In the framework of the invention, the locating surface of the interior space of the coupling nut comes in contact with the spring element in the course of the screwing together, and the spring element comes in contact with the back end of the end shape, such that the spring element is encompassed or clamped in the space between the locating surface of the coupling nut and the back end of the end shape on the fluid line. For practical purposes, the locating surface of the coupling nut runs over the internal circumference of the interior space.

Furthermore, in the framework of the invention, the spring element is disposed on the fluid line prior to the screwing together of the screw connection device, or is disposed behind the end shape of the fluid line, respectively. For practical purposes, the spring element is slid onto the fluid line prior to the screwing procedure, and is thus, basically held in place by the fluid line. It is recommended that the spring element, or the spring element slid onto the fluid line, respectively, can be displaced along the longitudinal axis of the fluid line. Preferably the spring element is elastically deformed in the course of the screwing procedure after it has been accommodated in the space between the locating surface and the back end. As a result, the spring element exerts a force on the coupling nut, or on the internal threading of the coupling nut, respectively, that increases the release torque. According to a particularly recommended embodiment of the invention, the spring element consists of a metal, or respectively, substantially consists of a metal, and is preferably made of steel, or substantially made of steel.

In the framework of the invention, the locating surface of the coupling nut is disposed such that it is at an angle to the longitudinal axis L of the fluid line, or the longitudinal axis L of the coupling nut, respectively, and preferably the locating surface of the coupling nut forms an angle α with the longitudinal axis L of the fluid line, or with the longitudinal axis of the coupling nut, respectively, of 10°-170°, particularly 20°-60°, preferably 30°-50°, and according to one embodiment variant, 35°-45°. In the framework of the invention, the angle specifications given above refer to the screwed together state of the screw connection device.

For practical purposes, the locating surface of the spring element at the coupling nut end is disposed at an angle to the longitudinal axis L of the fluid line, or the longitudinal axis L of the coupling nut, respectively, and preferably this locating surface of the spring element, at the end facing the coupling nut, forms an angle $\alpha_1$ with the longitudinal axis L of the fluid line of 10°-170°, preferably 20°-60°, particularly 30°-50°, and very preferably 35°-45°. Here as well, in the framework of the invention the angle specifications refer to the screwed together state of the screw connection device. Preferably the locating surface of the spring element at the end shape is disposed at an angle to the longitudinal axis L of the fluid line, and preferably this locating surface of the spring element facing the end shape forms an angle $\alpha_2$ with the longitudinal axis L of the fluid line of 10°-170°, particularly 20°-60°, preferably 30°-50°, and very preferably 35°-45°. In the framework of the invention, these angle specifications refer to the screwed together state of the screw connection device.

Furthermore, in the framework of the invention the back end of the end shape of the fluid line is disposed at an angle in relation to the longitudinal axis L of the fluid line, and this end shape band end, or the corresponding locating surface of the back end of the end shape forms and angle $\alpha_3$ with the longitudinal axis L of the fluid line of 10°-170°, preferably 20°-60°, particularly 30°-50°, and very particularly 35°-45°. These angle specifications are also in reference to the screwed together state of the screw connection device, for all practical purposes.

An alternative embodiment is characterized in that the locating surface of the coupling nut is a component of a stop shoulder of the coupling nut, and in that the locating surface is connected to a connecting surface angled away from the locating surface, and in that preferably the connecting surface is disposed parallel, or substantially parallel, to the longitudinal axis L of the fluid line or the longitudinal axis L of the coupling nut, respectively. In the framework of the invention the locating surface and the connecting surface of the stop shoulder form an angle $\alpha_4$ of 10°-170°, particularly 20°-60°, preferably 30°-50°, and particularly preferably 35°-45°.

It is recommended that the spring element exhibit a stop section, on which the locating surface of the spring element at the end facing the coupling nut and the locating surface of the spring element at the end facing the end shape are provided. Furthermore, the spring element exhibits a connection section that is angled away from the stop section, and preferably the connection section is disposed parallel to, or substantially parallel to the longitudinal axis L of the fluid line or the longitudinal axis L of the coupling nut. It is recommended that the stop section of the spring element forms an angle $\alpha_5$ to the connection section angled away therefrom of 10°-170°, particularly 20°-60°, preferably 30°-0°, and particularly preferably 35°-45°. In the framework of the invention the connection section of the spring element rests against the stop shoulder of the coupling nut on one end, and rests against the fluid line on the other end, when the screw connection device is in the screwed together state.

Another alternative preferred embodiment of the invention is characterized in that the spring element is disposed only, or substantially only, between the locating surface of the coupling nut and the back end. In this embodiment the spring element consists basically of only the stop section of the first alternative embodiment of the invention described above.

In the framework of the invention the fluid line passes through a hole in center of the coupling nut, and the locating surface of the coupling nut borders, or is connected to, the central hole. In doing so, the central hole can be connected directly to the locating surface of the coupling nut, or be connected to the locating surface by means of the connecting surface described above.

A particularly recommended embodiment of the invention is characterized in that the locating surface of the spring element facing the end shape is provided with a coating having a low frictional coefficient μ. For practical purposes the back end of the end shape allocated thereto, or the locating surface of the back end of the end shape of the fluid line allocated thereto, respectively, is also provided with a coating having a low friction coefficient μ.

The invention is based on the knowledge that with the screw connection device according to the invention, fluid lines having a liquid medium under high pressure can be readily and cost-effectively connected to one another. The implementation of the spring element according to the invention enables a simple and targeted adjustment or optimization of the frictional forces between the internal threading and the contact regions allocated thereto. By means of the geometry of the spring element, the size of the contact surfaces between the spring element and the end shape or flange and between the spring element and the coupling nut, or their relationship, respectively, can be determined in a simple manner. The initial screwing of the screw connection device according to the invention is associated with limited frictional forces and limited torsional forces. In the screwed together state, the frictional forces and torsional forces are increased. An unintentional releasing or and unintentional loosening of the connection, or screw connection, respectively, can substantially be prevented. Advantageously, the torque, which acts against a releasing of the screw connection, remains constant to a certain degree, even when turning or opening the screw connection, because the spring element continues to exert a corresponding force on the coupling nut, and thus on the internal threading of the coupling nut. A simple intentional releasing or loosening of the screw connection is, nevertheless, possible.

DESCRIPTION OF THE DRAWINGS

In the following the invention shall be explained in greater detail based on drawings which depict a single embodiment example. They show, in a schematic depiction:

FIG. 7 shows a portion of the subject matter of FIG. 3 on an enlarged scale.

DETAILED DESCRIPTION OF ILLUSTRATED EMBODIMENTS

Figure 1:
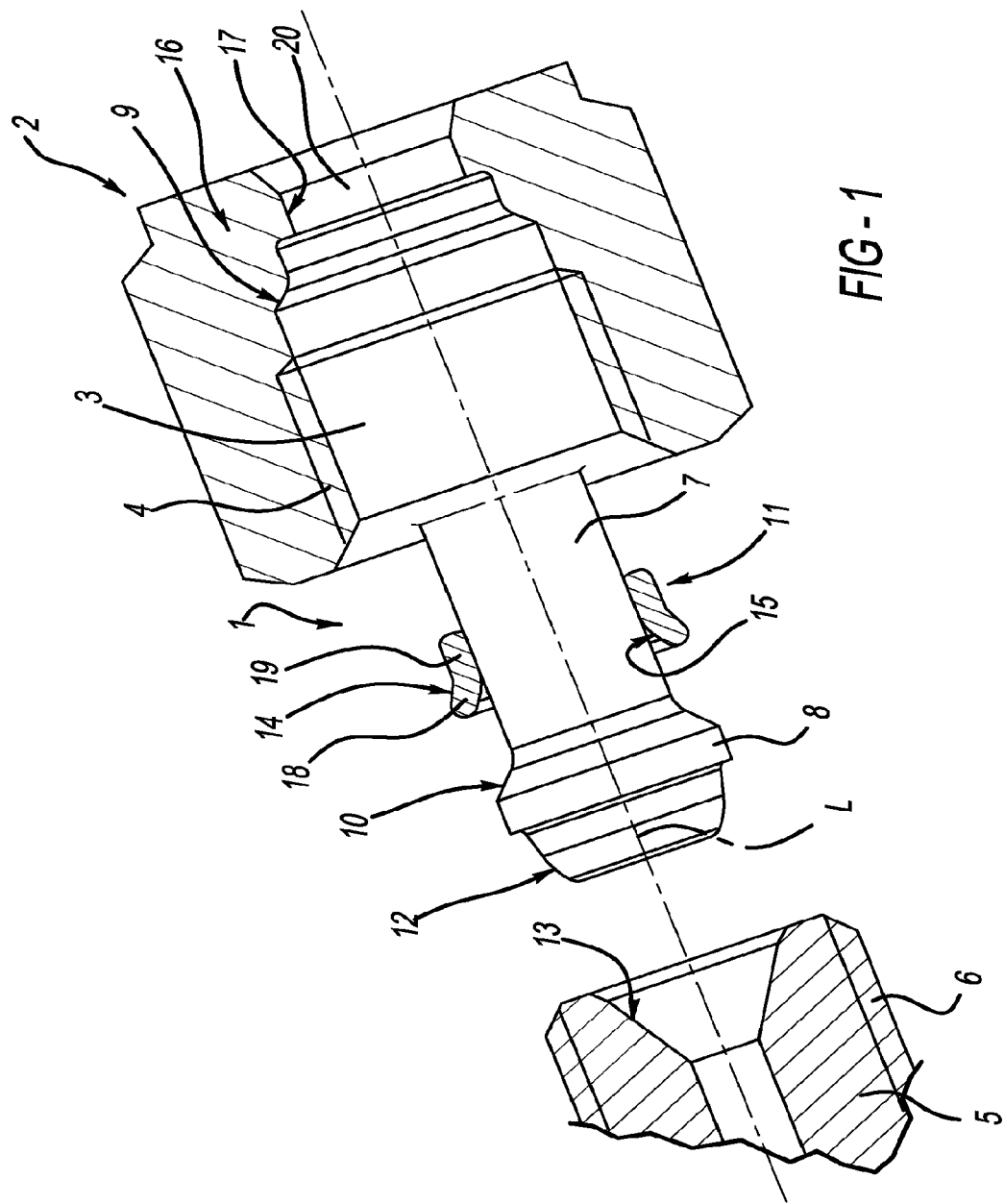
FIG. 1 a cutaway through a first embodiment of the screw connection according to the invention in the not yet screwed together state, FIG. 2 the subject matter according to FIG. 1 in a partially screwed together state, FIG. 3 the subject matter according to FIG. 1 in a fully screwed together state, FIG. 4 the subject matter according to FIG. 1 in a second embodiment, FIG. 5 the subject matter according to FIG. 2 in a second embodiment, and FIG. 6 the subject matter according to FIG. 3 in a second embodiment of the invention.

The figures show a screw connection device according to the invention, for fluid lines 1, in particular for motor vehicle fluid lines. The screw connection device has a coupling nut 2 with an interior space 3 and an internal threading 4 running over the circumference of the interior space 3. Moreover, the screw connection device exhibits a connecting element, which is designed as a connecting line 5 in the embodiment example, and is equipped with an external threading 6. In the screwed together state of the screw connection device (FIGS. 3 and 6), the external threading 6 engages with the internal threading 4 of the coupling nut 2.

A line end 7 of the fluid line 1 is accommodated in the coupling nut 2, or in the interior space 3 of the coupling nut 2, respectively, and said line end 7 exhibits a front end flange 8 (line flange). When screwing the internal threading 4 of the coupling nut 2 to the external threading 6 of the connecting element, or the connecting line 5, respectively, a back end locating surface 9 disposed in the interior space 3 of the coupling nut 2 is moved toward the back end 10 of the flange 8, or, conversely, the back end 10 of the flange is moved toward the locating surface 9 of the coupling nut, respectively (FIGS. 2 and 5). According to the invention, a spring element 11 is disposed between the locating surface 9 of the coupling nut 2 and the back end 10 of the flange 8, which runs over the circumference of the fluid line 1. For practical purposes and in the embodiment example (FIGS. 1 and 4), the spring element 11 is disposed on the fluid line 1, or is slid onto the fluid line 1, respectively, when the screw connection device is not yet screwed together.

In the course of the screwing the screw connection device together, the locating surface 9 of the coupling nut 2 comes in contact with the spring element 11, or the spring element 11 comes in contact with the back end 10 of the flange, such that the spring element 11 is basically clamped in the space between the locating surface 9 and the back end 10 of the flange. Preferably, and in the embodiment example, the spring element is compressed thereby. In the framework of the invention, the spring element 11 consists of a metal, and preferably consists of steel.

In the screwed together state of the screw connection device, the flange 8 of the line end 7 rests with a connecting surface 12 in a sealing manner, for practical purposes, against a complementary connecting surface 13 of the connecting line 5. Preferably, and in the embodiment example, the locating surface 9 of the coupling nut 2, when in the screwed together state of the screw connection device, forms an angle α with the longitudinal axis L of the fluid line 1 of 35°-45°, and in particular, an angle of a of approx. 40°.

For practical purposes, the locating surface 14 of the spring element 11 at the coupling nut end is disposed at an angle to the longitudinal axis L of the fluid line 1, and it is recommended that the locating surface 14 at the coupling nut end also forms an angle $\alpha_1$ with the longitudinal axis L of the fluid line 1, when in the screwed together state of the screw connection device, of 35°-45°, and in particular, an angle $\alpha_1$ of 40°. It is recommended that the locating surface 15 of the spring element 11 at the flange end is also disposed at an angle to the longitudinal axis L of the fluid line 1, and that this locating surface 15 at the flange end forms an angle $\alpha_2$ of 35°-45°, and in particular an angle $\alpha_2$ of approx. 40° with the longitudinal axis L of the fluid line 1, when the screw connection device is in the screwed together state. Moreover, it is preferred that the back end 10 of the flange 8 on the fluid line 1 is disposed at an angle in relation to the longitudinal axis L of the fluid line 1, and that the back end 10 of the flange forms an angle $\alpha_3$ of 35°-45°, and preferably approx. 40°, with the longitudinal axis L of the fluid line 1.

Figure 2:
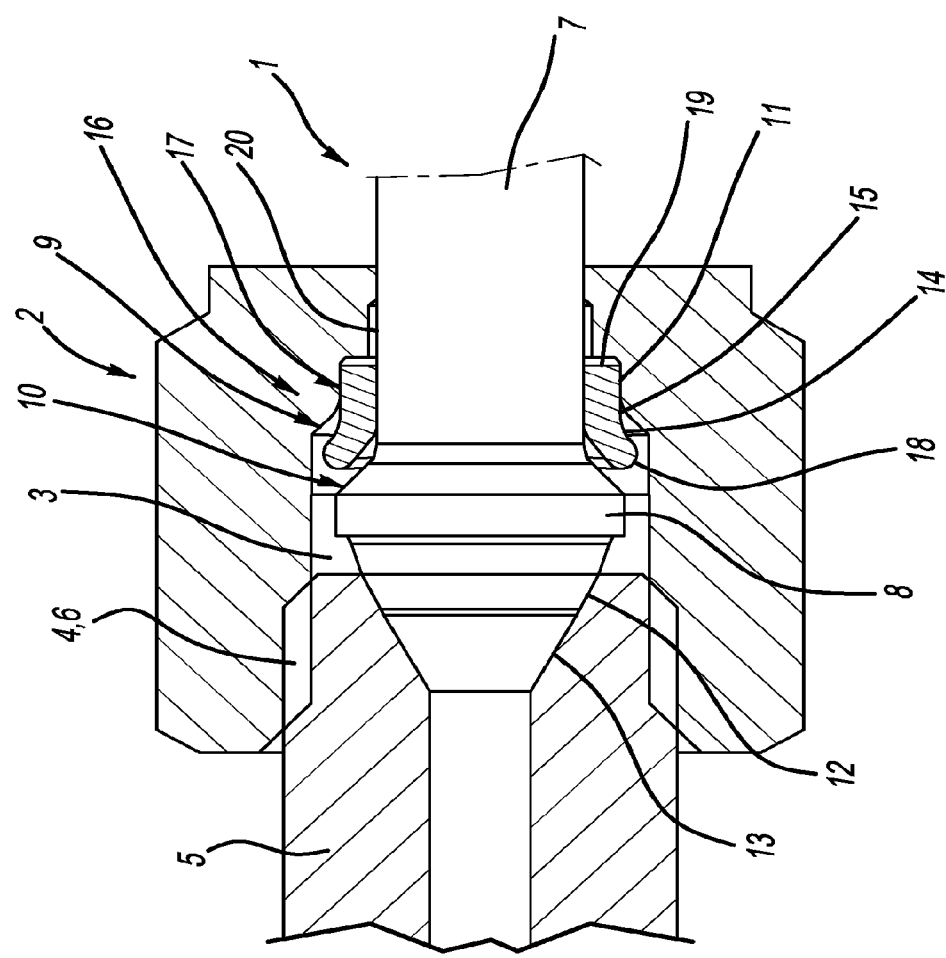
Figure 3:
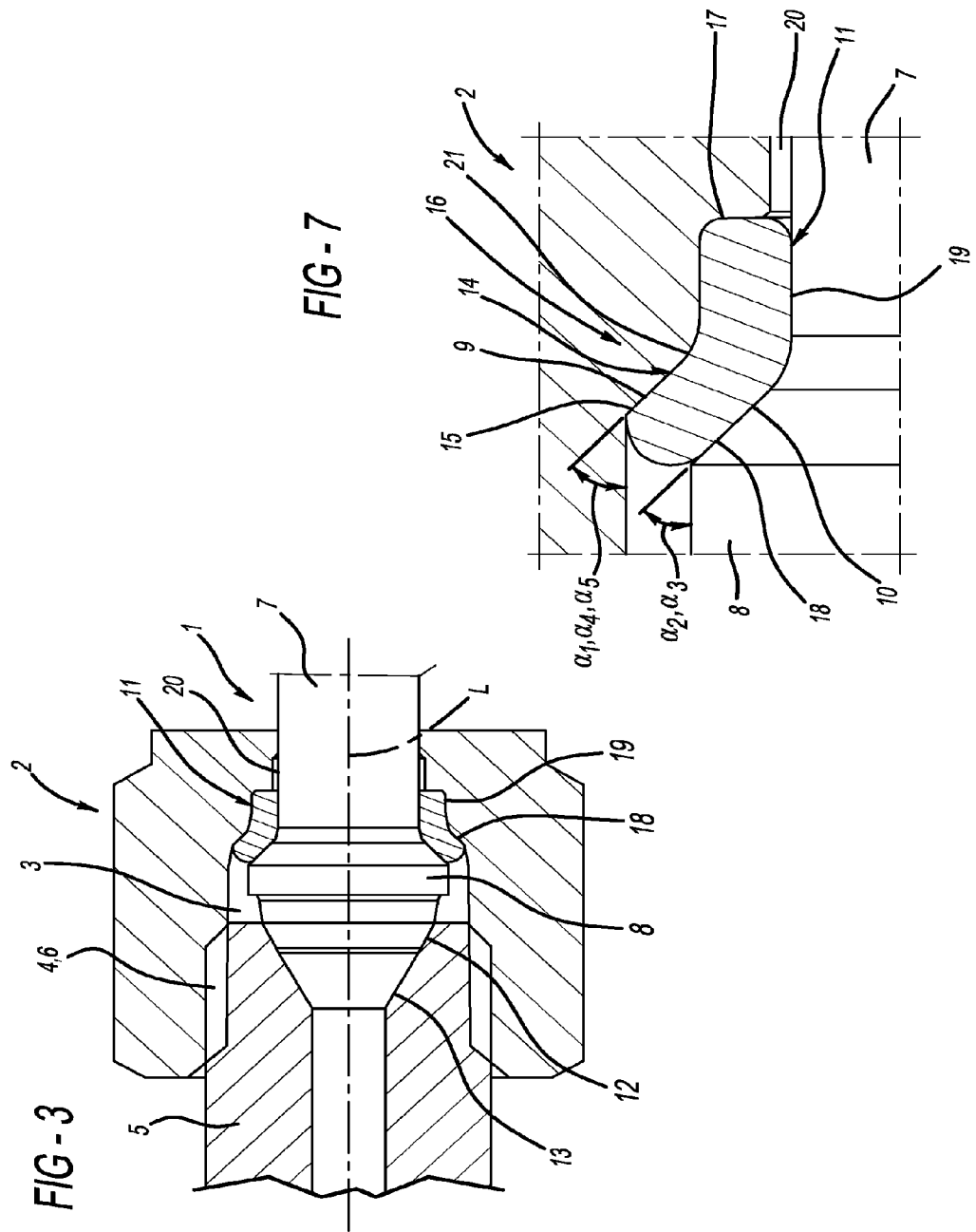

FIGS. 1-3 show a first embodiment of the screw connection device according to the invention. In this embodiment, the locating surface 9 of the coupling nut 2 is a component of a stop shoulder 16 of the coupling nut 2, and the locating surface 9 is connected in this case to the connecting surface 17 that is angled away from the locating surface 9. Preferably, and in the embodiment example, the connecting surface 17 is disposed parallel to the longitudinal axis L of the fluid line 1. It is recommended, and is the case in the embodiment example, that the locating surface 9 and the connecting surface 17 form an angle $\alpha_4$ of preferably 35°-45°, and in particular 40°. In this embodiment the spring element 11 has a stop section 18 for practical purposes, on which the locating surface 14 for the coupling nut and the locating surface 15 for the flange are provided. Moreover, the spring element 11 exhibits a connecting section 19, angled away from the stop section 18, which is preferably, and in the embodiment example, disposed parallel to the longitudinal axis L of the fluid line 1. The stop section 18 of the spring element 11 forms an angle $\alpha_5$ with the connection section 19 here of preferably 35°-45°, and in particular 40°. The connecting section 19 rests at one end against the connecting surface 17 of the stop shoulder 16, and at the other end on the fluid line 1. It can be derived from FIGS. 1-3 that the stop shoulder 16 is connected directly to a center hole 20 in the coupling nut 2, through which the fluid line 1 passes.

Figure 4:
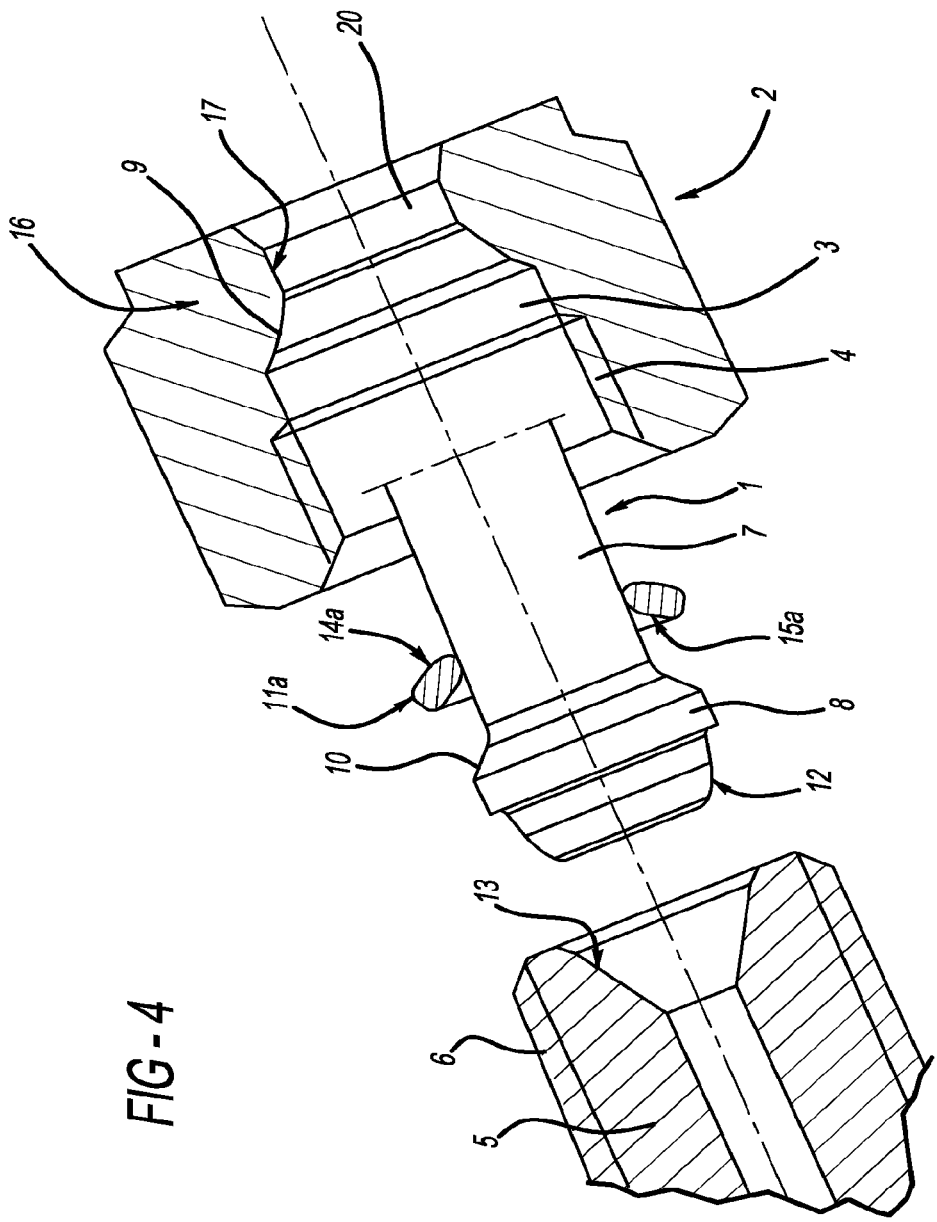
Figure 5:
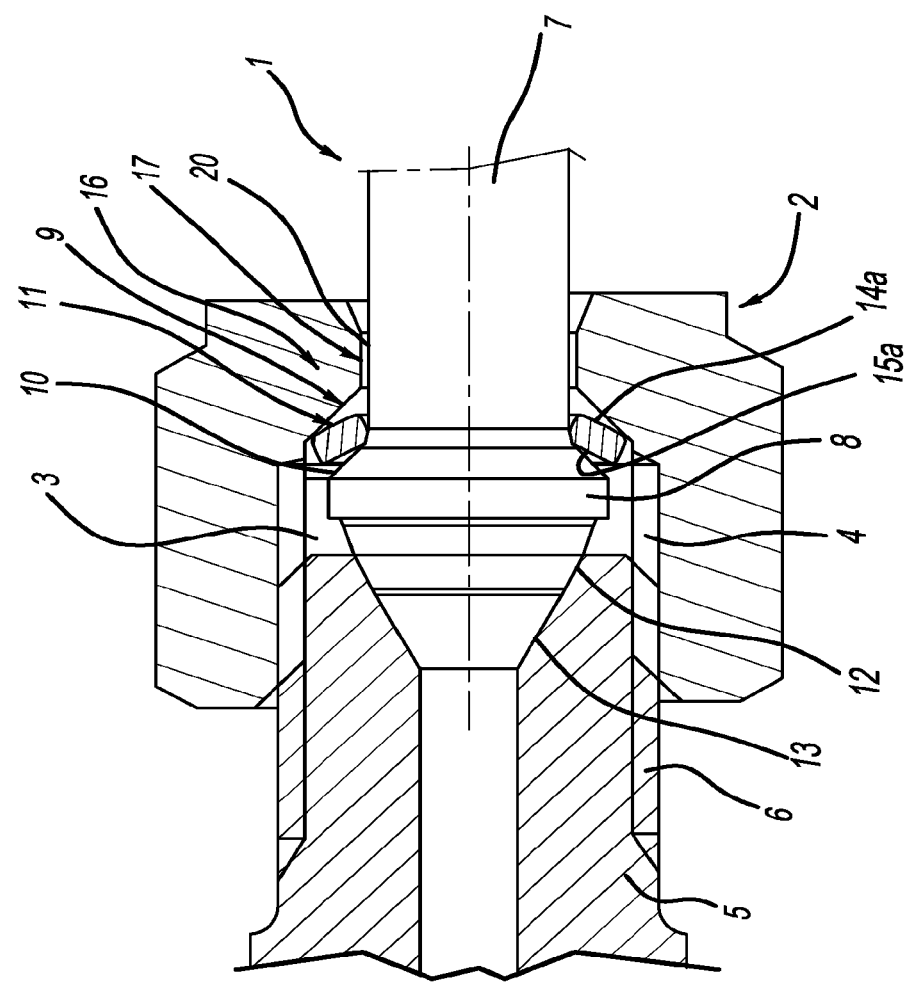

FIGS. 4-6 show a second preferred embodiment of the screw connection device according to the invention. In this case, the spring 11a is shorter than in the embodiment example according to FIGS. 1-3, and the spring element 11a is only disposed between the locating surface 9 of the coupling nut 2 and the back end 10 of the flange 8. The spring element 11a corresponds here, basically, only to the stop section 18 of the first embodiment of the invention explained above, and includes locating surfaces 14a and 15a. For practical purposes, and in the embodiment example, the locating surface 9 is connected directly to the center hole 20 of the coupling nut 2, through which the fluid line 1 passes in this embodiment.

It is indicated in FIG. 7 that at least the locating surface 15 of the spring element 11 at the flange end is provided with a coating 21 having a low friction coefficient μ. By this means, the occurrence of disadvantageous torsional forces can be prevented, and the unintentional releasing of the screw connection can be counteracted.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. A screw connection device for fluid lines, extending along a longitudinal axis (L) having a coupling nut with an internal wall having a thread thereon, said screw connection device having a connecting element with a mating external thread thereon,
   wherein the coupling nut is accommodated on a line end of a fluid line and, wherein the line end includes an end shape at a front end thereof, comprising a line flange, including a back end, wherein the line flange is a flaring of the fluid line,
   wherein, a conical locating surface of the coupling nut is disposed in the interior space of the coupling nut and is movable toward the back end of said line flange of said fluid line,
   and wherein a spring element is disposed on said fluid line between the conical locating surface of said coupling nut and the back end of said line flange, wherein the spring element is a single piece and comprises a stop section and a connecting section following each other in an axial direction, said stop section having a locating surface contacting said back end of said line flange and a locating surface contacting said conical locating surface of said coupling nut, said stop section being compressed between said back end of said line flange and said conical locating surface of said coupling nut, wherein both locating surfaces of the stop section are shaped conically, wherein the connecting section has an inner cylindrical surface and an outer cylindrical surface,
   wherein the spring element comprises
   a first end that belongs to the stop section and a second outermost axial end that belongs to the connecting section and wherein the second outermost axial end is substantially perpendicular with the inner and outer cylindrical surfaces of the connecting section, wherein the second outermost axial end of the spring element is completely contained within and directly abuts the coupling nut in an axial direction in a screwed-together state.

2. The screw connection device according to claim 1, wherein the connecting element is a connecting line.

3. The screw connection device according to claim 1, wherein the end shape of the line end rests with a connecting surface against a complementary connecting surface of the connecting element when the screw connection device is in the screwed together state.

4. The screw connection device according to claim 1, wherein the conical locating surface of the coupling nut comes in contact with the spring element during movement of said conical locating surface of said coupling nut toward the back end of said line flange, and the spring element comes in contact with the back end of the end shape, such that the spring element is clamped, respectively, in the space between the conical locating surface and the back end of the end shape.

5. The screw connection device according to claim 4, wherein the spring element is deformed in the course of said movement.

6. The screw connection device according to claim 1, wherein the spring element consists of metal.

7. The screw connection device according to claim 1, wherein the conical locating surface of the coupling nut is disposed at an angle to the longitudinal axis (L) of the fluid line, and wherein the conical locating surface of the coupling nut forms an angle ($\alpha$) with the longitudinal axis (L) of the fluid line of 10°-170°.

8. The screw connection device according to claim 7, wherein the locating surface of the spring element contacting the conical locating surface of the coupling nut is disposed at an angle to the longitudinal axis (L) of the fluid line, and wherein, said locating surface of the spring element contacting the conical locating surface of the coupling nut forms an angle ($\alpha_1$) with the longitudinal axis (L) of the fluid line of 10°-170°.

9. The screw connection device according to claim 8, wherein the locating surface of the spring element contacting said back end of said line flange is disposed at an angle to the longitudinal axis (L) of the fluid line, and wherein, said locating surface of the spring element contacting said back end of said line flange forms an angle ($\alpha_2$) with the longitudinal axis (L) of the fluid line of 10°-170°.

10. The screw connection device according to claim 9, wherein the end shape of the fluid line at the back end of the line flange is disposed at an angle to the longitudinal axis (L) of the fluid line, and forms an angle ($\alpha_3$) with the longitudinal axis (L) of the fluid line of 10°-170°.

11. The screw connection device according to claim 1, wherein the conical locating surface of the coupling nut is a component of a stop shoulder of the coupling nut, and wherein a connecting surface angled away from the conical locating surface is connected to the conical locating surface, and wherein the connecting surface is disposed parallel to the longitudinal axis (L) of the fluid line.

12. The screw connection device according to claim 1, wherein the fluid line passes through a center hole of the coupling nut, and wherein the conincal locating surface of the coupling nut abuts, or is connected to, the center hole.

13. The screw connection device according to claim 1, wherein the locating surface of the spring element contacting said back end of said line flange is provided with a coating having a friction coefficient ($\mu$) which prevents occurrence of disadvantageous torsional forces.

14. A screw connection device for fluid lines, extending along a longitudinal axis (L), the screw connection device comprising:
   a coupling nut with an internal wall having a thread thereon,
   a connecting element with a mating external thread thereon,
   a line end of a fluid line, wherein the coupling nut is accommodated on the line end,
   an end shape of the line end disposed at a front end of the line end, the end shape comprising a line flange including a back end, wherein the line flange is a flaring of the fluid line,
   a conical nut locating surface of the coupling nut, wherein the conincal nut locating surface of the coupling nut is disposed in the interior space of the coupling nut and is movable toward the back end of the line flange of the end shape of the fluid line,
   a spring element disposed on the fluid line between the concial nut locating surface of the coupling nut and the back end of the line flange,
   wherein the spring element includes a first spring locating surface contacting the back end of the line flange and a second spring locating surface contacting the conical nut locating surface of the coupling nut, wherein the spring element is compressed between the back end of the line flange and the conincal nut locating surface of said coupling nut, wherein the spring element is a single-piece and includes a stop section and a connecting section following each other in an axial direction, the connecting section angled away from the stop section, the stop section includes the second spring locating surface that contacts the conical nut locating surface and the first spring locating surface that contacts the back end of the line flange of the end shape, wherein the first and second spring locating surfaces are shaped conically, and wherein the connecting section is disposed parallel to the longitudinal axis (L) of the fluid line and the connecting section includes an inner cylindrical surface and an outer cylindrical surface, and the stop section is disposed at an angle transverse to the longitudinal axis (L), wherein the spring element comprises a first end that belongs to the stop section and a second outermost axial end that belongs to the connecting section and wherein the second outermost axial end is substantially perpendicular with the inner and outer cylindrical surfaces of the connecting section, wherein the second outermost axial end of the spring element is completely contained within and directly abuts the coupling nut in an axial direction in a screwed-together state.

15. The screw connection device according to claim 14, wherein the coupling nut defines a connecting surface angled away from the conical nut locating surface of the coupling nut and is connected to the conical nut locating surface, wherein the connecting surface is disposed parallel to the longitudinal axis (L) of the fluid line, the connecting section of the spring element is disposed radially between the fluid line and the connecting surface of the coupling nut and contacts the fluid line and the connecting surface of the coupling nut, and the stop section of the spring element is disposed between the conincal nut locating surface of the coupling nut and the back end of the line flange and contacts the conical nut locating surface of the coupling nut and the back end of the line flange.

* * * * *